United States Patent
Li et al.

(10) Patent No.: US 10,325,412 B2
(45) Date of Patent: Jun. 18, 2019

(54) CUTTING THREE-DIMENSIONAL IMAGE

(71) Applicant: Shenyang Neusoft Medical Systems Co., Ltd., Shenyang (CN)

(72) Inventors: Bingsheng Li, Shenyang (CN); Wei He, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 150 days.

(21) Appl. No.: 15/342,977

(22) Filed: Nov. 3, 2016

(65) Prior Publication Data
US 2017/0132791 A1 May 11, 2017

(30) Foreign Application Priority Data

Nov. 5, 2015 (CN) .......................... 2015 1 0746704
Sep. 13, 2016 (CN) .......................... 2016 1 0821054

(51) Int. Cl.
G06T 19/20 (2011.01)
(52) U.S. Cl.
CPC .......... *G06T 19/20* (2013.01); *G06T 2210/41* (2013.01); *G06T 2219/2021* (2013.01)
(58) Field of Classification Search
CPC .................... G06T 7/0081; G06T 2207/10012
USPC ....................................................... 382/154
See application file for complete search history.

(56) References Cited

U.S. PATENT DOCUMENTS

| | | | |
|---|---|---|---|
| 7,483,023 B2 | 1/2009 | Cardenas et al. | |
| 8,249,320 B2 | 8/2012 | Li et al. | |
| 8,411,919 B2 | 4/2013 | Kiraly et al. | |
| 2007/0036414 A1* | 2/2007 | Georgescu | G06T 7/12 382/128 |
| 2009/0037154 A1* | 2/2009 | Ecabert | G06T 7/12 703/2 |
| 2012/0069017 A1* | 3/2012 | Zheng | G06T 17/20 345/420 |

(Continued)

FOREIGN PATENT DOCUMENTS

| | | |
|---|---|---|
| CN | 101331517 A | 12/2008 |
| CN | 102596025 B | 10/2013 |

(Continued)

OTHER PUBLICATIONS

Zhang Jianxun et al.; Liver and Its Internal Piping Visualization system Based on the Images of CT; Computer Engineering and Applications, 2004(31).

*Primary Examiner* — Jonathan S Lee
(74) *Attorney, Agent, or Firm* — Fish & Richardson P.C.

(57) ABSTRACT

Methods and devices for cutting a three-dimensional image are disclosed. According to one example of the methods, a region of interest may be selected from an original three-dimensional image. A mesh model of the region of interest may be constructed. Then, distance field information and a shape index characteristic value of each mesh point in the mesh model may be obtained. A set of initiation points and a set of termination points may be obtained by splitting the mesh model according to the distance field information. Afterward, a mixed cost value of each mesh point may be obtained according to the distance field information, the shape index characteristic value and an image value of each mesh point. In this way, a cutting path may be determined from the set of initiation points and the set of termination points according to the mixed cost value.

20 Claims, 11 Drawing Sheets

(56) References Cited

U.S. PATENT DOCUMENTS

| | | | | |
|---|---|---|---|---|
| 2012/0321169 | A1* | 12/2012 | Baloch | G06K 9/4638 |
| | | | | 382/133 |
| 2013/0163836 | A1* | 6/2013 | Pau | G06T 7/00 |
| | | | | 382/128 |
| 2015/0078641 | A1* | 3/2015 | Tan | G06T 7/0012 |
| | | | | 382/131 |
| 2016/0035087 | A1* | 2/2016 | Jackson | G06T 7/60 |
| | | | | 382/131 |
| 2018/0120478 | A1* | 5/2018 | Imhof | G01V 99/005 |

FOREIGN PATENT DOCUMENTS

| | | |
|---|---|---|
| CN | 104952068 A | 9/2015 |
| WO | 2006054267 A1 | 5/2006 |
| WO | 2006076443 A1 | 7/2006 |
| WO | 2011046511 A1 | 4/2011 |
| WO | 2012176100 A1 | 12/2012 |

* cited by examiner

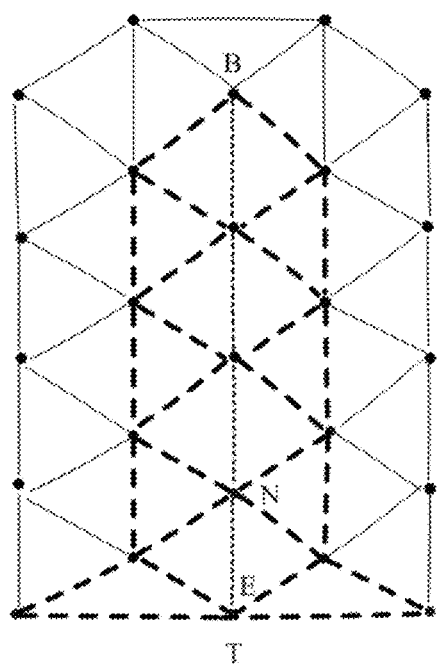
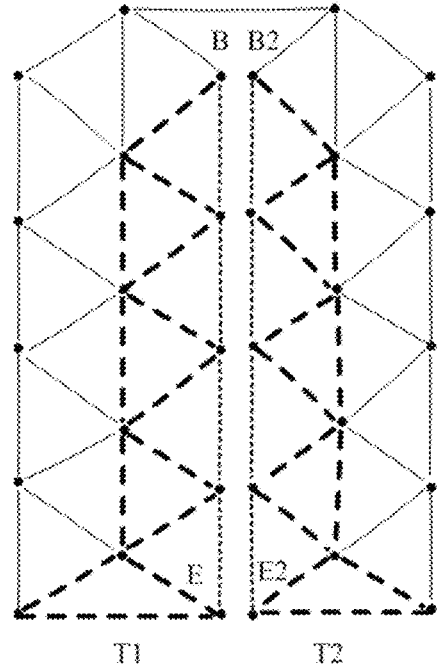

FIG. 10A  FIG. 10B

─ 151
Calculating a gray scale cost statistical value of each mesh point

─ 152
Calculating the mixed cost value fCost of each mesh point

FIG. 11

─ 161
Determining a minimum cost path from each initiation point to a corresponding termination point according to the mixed cost value of each mesh point ─ 162
Determining the cutting path by comparing the path cost values of all the minimum cost paths, where the minimum cost path having the minimum path cost value may be the cutting path

FIG. 12

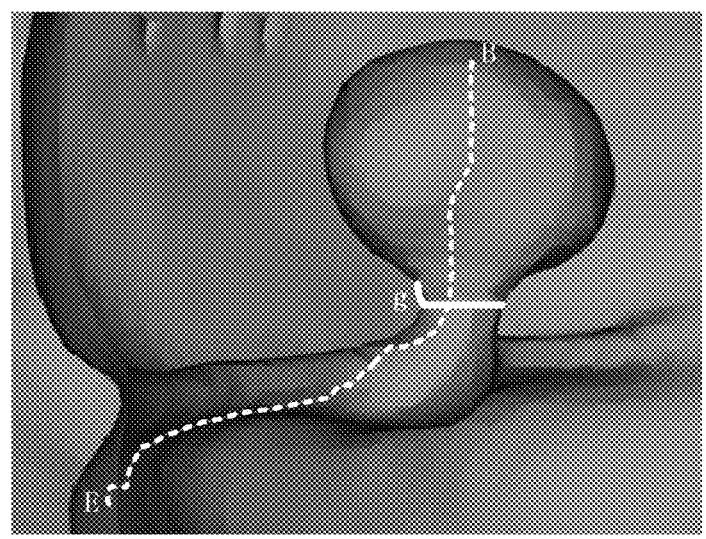
FIG. 13
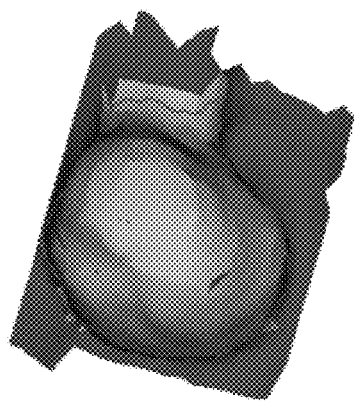
FIG. 14
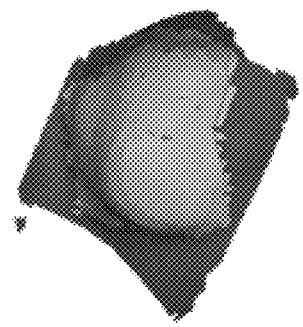 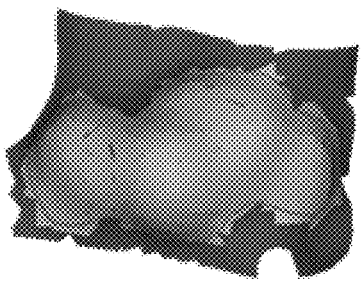
FIG. 15A    FIG. 15B

CUTTING THREE-DIMENSIONAL IMAGE

CROSS REFERENCE TO RELATED APPLICATIONS

This application claims priority under 35 U.S.C. § 119 to Chinese Patent Applications CN201510746704.8 filed on Nov. 5, 2015 and CN201610821054.3 filed on Sep. 13, 2016. The contents of these priority applications are hereby incorporated by reference in their entireties.

TECHNICAL FIELD

The present disclosure relates to cutting a three-dimensional image.

BACKGROUND

Medical image cutting may refer to differentiating a lesion tissue from a normal tissue based on medical images so as to facilitate subsequent diagnosis and surgical treatment, etc. For example, by cutting a Computed Tomography (CT) image of a colon having polyps based on spherical or semispherical geometric structures of lesion tissues and parameters such as shape curvature and so on, a cutting surface of the colon having polyps may be determined. However, actual polyps of the colon may be classified into different types of polyps, e.g., sessile polyps, pedicled polyps, flat polyps, and so on, according to surface types of the polyps. The foregoing cutting method may be limited, e.g., only applicable to pedicled polyps.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

FIGS. 10A and 10B illustrate schematic diagrams of splitting the mesh model according to an example of the present disclosure;

FIG. 11 illustrates a flowchart of a specific implementation of block 15 in FIG. 1 according to an example of the present disclosure;

FIG. 12 illustrates a flowchart of a specific implementation of block 16 in FIG. 1 according to an example of the present disclosure;

FIG. 13 illustrates a schematic diagram of determining a minimum cost path according to an example of the present disclosure;

FIG. 14 illustrates an effect diagram of cutting polyps of the colon from the region of interest as shown in FIG. 3 according to the method provided by the present disclosure;

FIGS. 15A, 15B, 15C, 15D and 15E illustrate effect diagrams of cutting various types of polyps of the colon according to the method provided by the present disclosure;

DETAILED DESCRIPTION

In medical imaging technologies such as Computed Tomography (CT), Positron Emission Tomography (PET), Magnetic Resonance Imaging (MRI), ultrasonography and so on, data that may indicate one or more physical characteristics of human tissues may be obtained by non-intrusive examinations, and a three-dimensional image displaying human tissues characteristics may be obtained (or acquired) according to the data.

Image cutting may be performed on the obtained (or acquired) three-dimensional image to determine one or more shape parameters of lesion tissues, such as areas, sizes and diameters, or the like. The lesion tissues may be polyps of a colon, aneurysms, lung nodules, and so on. In this way, a diagnosis may be made and an operation may be designed according to the shape parameters.

Taking polyps of the colon as an example, polyps of the colon may refer to tumor lesion tissues protruding from colonic mucosal surfaces to enteric cavities. In a clinical diagnosis, it may be relatively difficult to cut three-dimensional images of polyps of the colon because the colon is longer and shaped like curved pipes and colonic walls are complex in texture and crinkly, etc.

The present disclosure provides a method of cutting a three-dimensional image. According to the method, a mesh model of a region of interest may be constructed by image values based on pixels, and a set of initiation points and a set of termination points may be obtained based on distance field information of the mesh model, and then a cutting path for cutting a target tissue may be determined from the set of initiation points and the set of termination points according to the distance field information, shape characteristic and image value distribution or the like of the mesh model.

Figure 1:
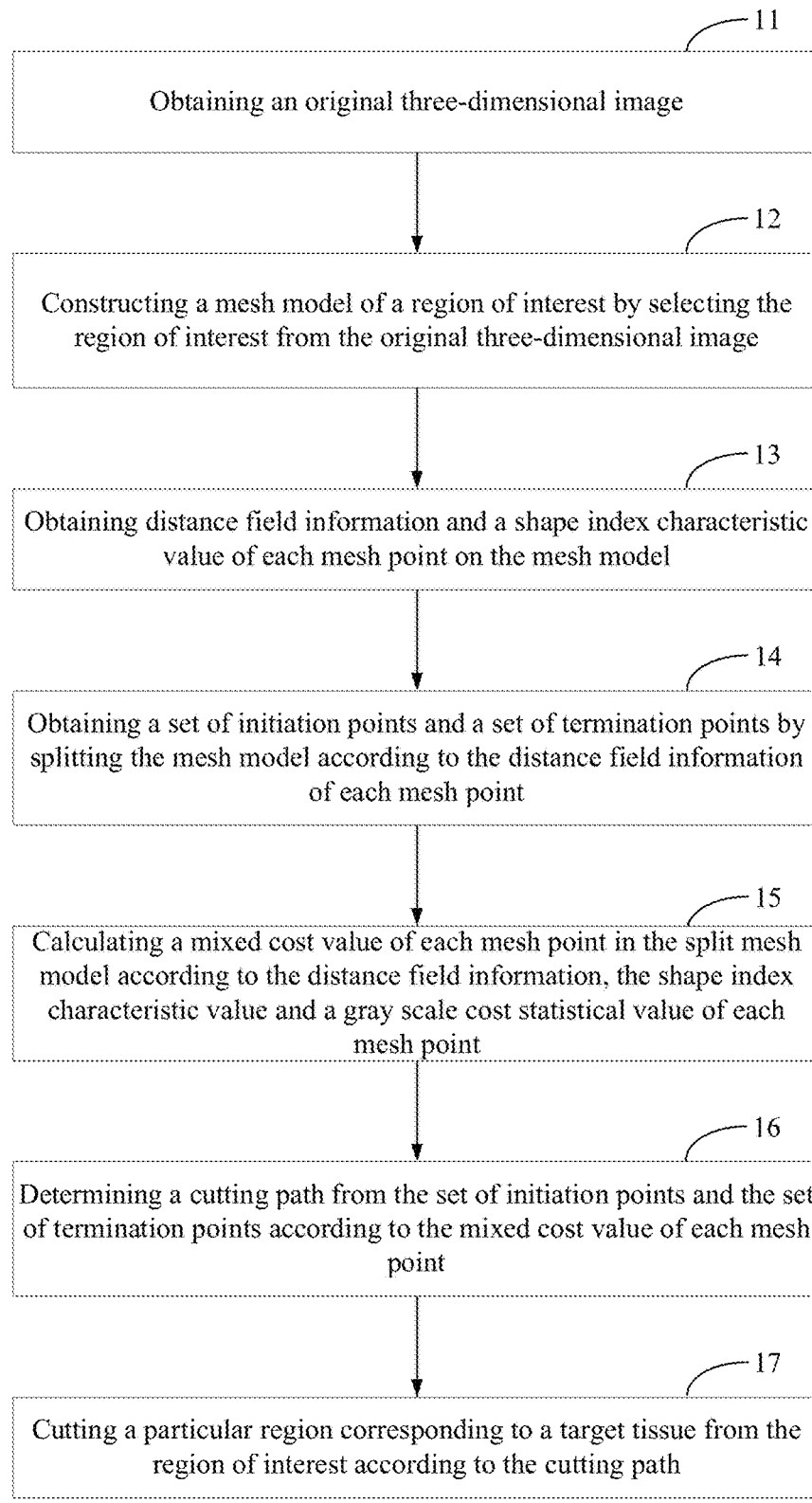
FIG. 1 illustrates a flowchart of a method of cutting a three-dimensional image according to an example of the present disclosure.

FIG. 1 illustrates a flowchart of a method of cutting a three-dimensional image according to an example of the present disclosure, which may include the following blocks 11-17.

At block 11, an original three-dimensional image may be obtained.

Based on a data set collected by scanning a patient by using a medical imaging device, a medical image may be formed. When the foregoing data set is three-dimensional array data, the medical image may be displayed in a unit referred to as a voxel. The voxel may be a point that can be located by a three-dimensional coordinate system.

In the present disclosure, a detailed description may be made by taking cutting a three-dimensional image of polyps of the colon as an example. An original three-dimensional image of the colon part may be obtained from block 11.

In an example, the original three-dimensional image of the colon may be a CT image of the colon. A process for obtaining the original three-dimensional image may be described hereinafter with reference to an imaging principle of the CT image. A CT may be used to scan a subject to be scanned, for example, a certain part of a human body may be scanned by using X-rays. X-rays may penetrate through the part of the human body and be received by a detector. The X-rays received by the detector may be converted into a visible light, then the visible light may be converted by a photoelectric converter into an electrical signal, and then the electrical signal may be converted by an analog/digital converter (ADC) into a digital signal. The digital signal may be referred to as a raw data set, or also may be referred to as a projection data set. An X-ray attenuation coefficient or absorption coefficient of each voxel may be obtained based on the raw data set, which also may be referred to as a CT value. These coefficients may be converted by a digital/analog converter (DAC) into small blocks (e.g., voxels) having different gray scales from black to white. These voxels may be arranged in a matrix, thereby constituting the CT image.

Referring back to FIG. 1, at block 12, a mesh model of a region of interest may be constructed by selecting the region of interest (ROI) from the original three-dimensional image.

In an example of the present disclosure, block 12 may specifically include selecting a region of interest (ROI) of polyps of a colon from an original three-dimensional CT image of the colon.

Figure 2:
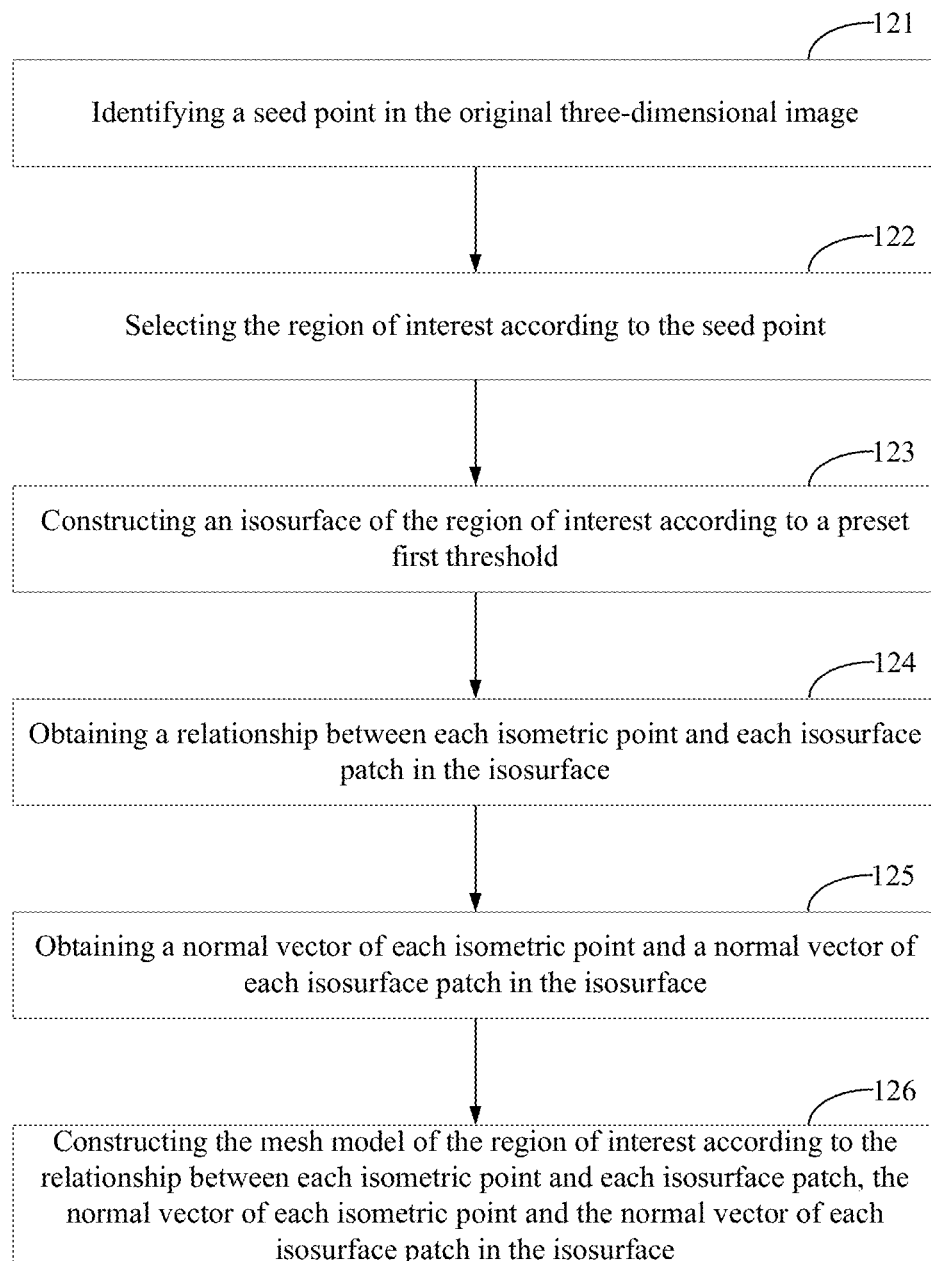
FIG. 2 illustrates a flowchart of a specific implementation of block 12 in FIG. 1 according to an example of the present disclosure.

FIG. 2 is a flowchart of a specific implementation of block 12 in FIG. 1 of the present disclosure, which may include the following blocks 121-126.

At block 121, a seed point may be identified in the original three-dimensional image.

In an example of the present disclosure, an instruction of the seed point selected by a medical staff may be received through interface units such as a mouse, a keyboard, a touch screen or the like, and the seed point may be identified in the original three-dimensional image of the colon according to the received instruction. In an example of the present disclosure, the seed point may be a voxel, or may be a set composed of a plurality of voxels, or may be a region composed of a plurality of adjacent voxels with each other.

At block 122, the region of interest may be selected according to the seed point.

Figure 3:
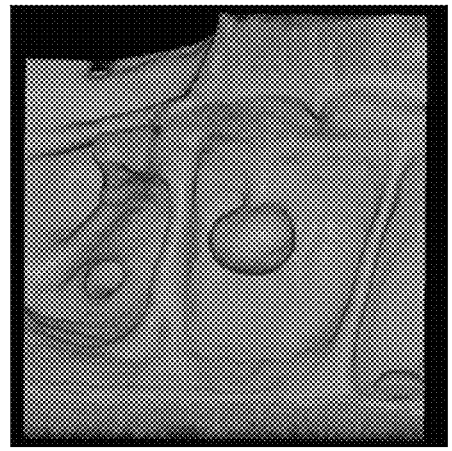
FIG. 3 illustrates a schematic diagram of a region of interest according to an example of the present disclosure.

In an example of the present disclosure, an image region of polyps of the colon may be selected as the ROI according to the identified seed point. For example, as shown in FIG. 3, the ROI whose length, width and height are respectively 5 cm~10 cm may be selected according to the seed point.

At block 123, an isosurface of the region of interest may be constructed according to a preset first threshold.

In an example of the present disclosure, a threshold may be pre-set based on an image value, for example, a CT value −700 Hu, and then the isosurface of the ROI may be constructed by using, for example, a marching cubes (MC) algorithm based on the threshold. The so-called isosurface may be a set of all points having a certain identical image value in space.

The marching cubes algorithm may be a classical algorithm used to reconstruct a three-dimensional medical image. In the marching cubes algorithm, it may be assumed that an original data set such as a CT image data set is a discrete three-dimensional spatial regular data set. A cube may be defined as a cuboid restricted by eight vertexes (e.g., eight voxels) on an adjacent layer. Each cube may be surrounded by 26 other cubes. These 26 cubes may be regarded as adjacent cubes of the cube. To construct an isosurface, an image value of the isosurface may be determined first, e.g., the first threshold may be set. In an example, the image value of the isosurface may be set as a CT value of −700 Hu. A basic thought of the MC algorithm may be to process voxels in the ROI one by one, including comparing an image value such as a gray-scale value or the like of each of the cubes in the ROI with the first threshold, so as to discover an attention cube that may intersect with the isosurface. Then, intersection points of the isosurface and an edge of the attention cube may be determined by performing an interpolation operation based on coordinate information of each of the vertexes and image values of voxels of each of the vertexes in the attention cube, where the intersection points may be also referred to as isometric points hereinafter. Afterward, isometric points may be connected into an isosurface patch in a certain topological form, such as a triangle. A set of all (for example triangular) isosurface patches may constitute the isosurface of the ROI. Hereinafter, a triangular isosurface patch may be taken as an example for illustration, which may be abbreviated as a triangular patch.

Figure 4A:
FIGS. 4A and 4B illustrate schematic diagrams of an isosurface of the region of interest according to an example of the present disclosure.
Figure 4B:
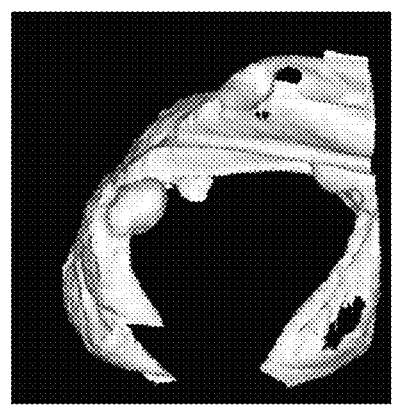

In another example of the present disclosure, between the foregoing block 123 and the following block 124, an isosurface having a maximum area may be selected, which may be referred to as a maximum isosurface hereinafter. After the maximum isosurface is selected, other isosurfaces having smaller areas and not connected with the maximum isosurface may be further removed. As shown in FIG. 4A and FIG. 4B, FIG. 4A is a schematic diagram of an isosurface of the ROI as shown in FIG. 3; and FIG. 4B is a schematic diagram of an isosurface of the ROI after other isosurfaces not connected with the maximum isosurface are removed. By removing isosurfaces having smaller areas, interference tissues of the ROI in polyps of the colon may be effectively eliminated, thereby increasing a robustness of subsequent processing.

At block 124, a relationship between each isometric point and each isosurface patch in the isosurface may be obtained, where the relationship may include a point-point relationship, a face-face relationship, a point-face relationship, a face-point relationship, or the like.

The isosurface of the ROI may be constituted by splicing triangular patches formed by mutually connecting isometric points. Each triangular patch and each isometric point may have a corresponding identity (ID). For example, the ID of an isometric point may be a coordinate value of the isometric point in a three-dimensional coordinate system. The ID of an isosurface patch may be an average value of coordinate values of all isometric points connected to form the isosurface patch. In such a case, the foregoing point-point relationship may be represented by an ID list PPlist recording an adjacent relationship between a current point and an adjacent point. The face-face relationship may be represented by an ID list FFlist recording an adjacent relationship between a current face and an adjacent face. The point-face relationship may be represented by an ID list PFlist recording a relationship where a current point belongs to an adjacent interval patch. The face-point relationship may be represented by an ID list FPlist recording a relationship where a current triangular patch may include vertexes.

At block 125, a normal vector of each isometric point and a normal vector of each isosurface patch in the isosurface may be obtained.

The normal vector of each isosurface patch may be obtained by calculating a cross product of any two edges on the isosurface patch. The normal vector of an isometric point may be obtained by calculating an average value of normal vectors of all isosurface patches on which the isometric point is.

At block 126, the mesh model of the region of interest may be constructed according to the relationship between each isometric point and each isosurface patch in the isosurface, the normal vector of each isometric point and the normal vector of each isosurface patch.

Figure 5:
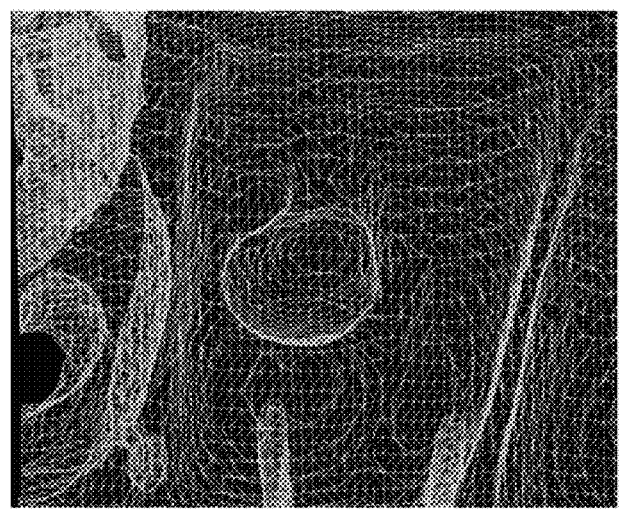
FIG. 5 illustrates a schematic diagram of a mesh model of the region of interest according to an example of the present disclosure.

As an example, FIG. 5 illustrates a triangular mesh model constructed for the ROI as shown in FIG. 3. As can be seen, the triangular mesh model may be a piece-wise linear surface formed by splicing triangular patches in a three-dimensional space. Each triangular patch may be formed by connecting three isometric points, and an edge formed by connecting every two isometric points may be included in at most two triangular patches.

Statistical information may be calculated after constructing the mesh model of the ROI of polyps of the colon. In an example of the present disclosure, the statistical information may include distance field information and a shape index (SI) characteristic value of each point in the mesh model. As can be seen, based on the preceding introduction, each point in the mesh model may be the isometric point, which may also be hereinafter referred to as a mesh point.

Referring back to FIG. 1, at block 13, distance field information and a shape index characteristic value of each mesh point on the mesh model may be obtained.

Figure 6:
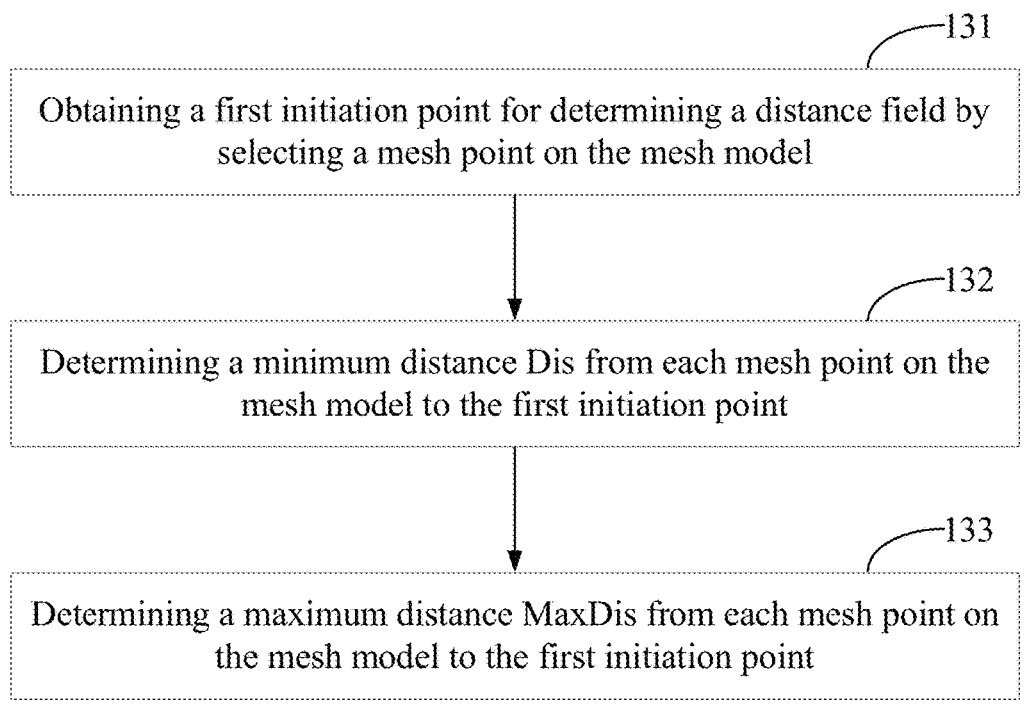
FIG. 6 illustrates a flowchart of calculating distance field information for the mesh model according to an example of the present disclosure.

In one aspect, FIG. 6 illustrates a flowchart of calculating distance field information for the mesh model according to an example of the present disclosure, which may include the following blocks 131-133.

At block 131, a first initiation point may be determined by selecting a mesh point on the mesh model, where the first initiation point may be used for determining a distance field.

In an example of the present disclosure, a mesh point nearest to the seed point may be selected as the first initiation point for determining a distance field. It may be noted that herein if the seed point is just positioned on the mesh model, the seed point may be used as the first initiation point for determining a distance field.

At block 132, a minimum distance Dis from each mesh point to the first initiation point may be determined.

In an example of the present disclosure, the minimum distance Dis from each mesh point on the mesh model to the first initiation point may be determined by using a shortest path algorithm such as a Dijkstra algorithm or a Fast Marching algorithm.

At block 133, a maximum distance MaxDis from each mesh point to the first initiation point may be determined. In an example of the present disclosure, the maximum distance MaxDis from each mesh point to the first initiation point may be determined by selecting a maximum from two or more distances which are obtained in determining the minimum distance Dis.

The minimum distance Dis and the maximum distance MaxDis from each mesh point to the first initiation point may belong to the distance field information of the mesh model.

Figure 7:
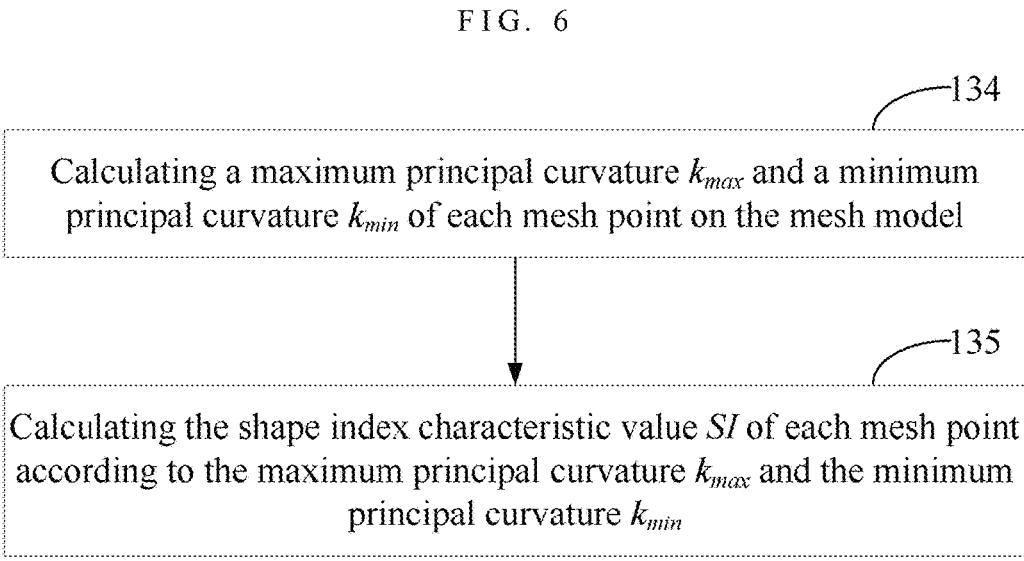
FIG. 7 illustrates a flowchart of calculating a shape index characteristic for the mesh model according to an example of the present disclosure.

In another aspect, FIG. 7 illustrates a flowchart of calculating a shape index characteristic value for the mesh model according to an example of the present disclosure, which may include the following blocks 134-135.

At block 134, a maximum principal curvature $k_{max}$ and a minimum principal curvature $k_{min}$ of each mesh point may be calculated.

Figure 8:
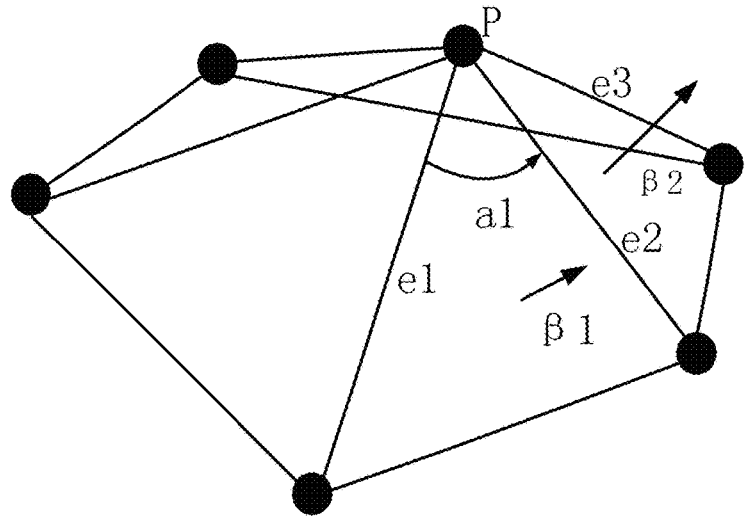
FIG. 8 illustrates a schematic diagram of a relationship between a point and an adjacent point or surface in the mesh model according to an example of the present disclosure.

There may be many methods of calculating the maximum principal curvature $k_{max}$ and the minimum principal curvature $k_{min}$ of each mesh point. With reference to a schematic diagram of a relationship between a mesh point and an adjacent point or surface, as shown in FIG. 8, in an example of the present disclosure, the following method may be used to calculate the maximum principal curvature $k_{max}$ and the minimum principal curvature $k_{min}$ of a mesh point P.

First of all, a first characteristic quantity K(P) of the mesh point P may be calculated by using Formula (1) as below:

$$K(P) = \frac{2\pi - \sum_{i=0}^{n-1} \alpha_i}{\frac{1}{3}A}, \quad (1)$$

where K(P) may represent a relationship of included angles between the mesh point P and adjacent points; $\alpha_i$ may represent an internal included angle of a triangular patch with taking the mesh point P as a vertex, as shown in FIG. 8; and A may represent a sum of areas of triangular patches where the mesh point P is. For example, in FIG. 8, A is equal to the sum of areas of five triangular patches with taking the mesh point P as a vertex.

Then, a second characteristic quantity H(P) of the mesh point P may be calculated by using Formula (2) as below:

$$H(P) = \frac{\frac{1}{4}\sum_{i=0}^{n-1}\|e_i\|\beta_i}{\frac{1}{3}A}, \quad (2)$$

where H(P) may represent a relationship of edges between the mesh point P and adjacent points; $\beta_i$ may represent an included angle between normal vectors of two adjacent triangular patches with taking the mesh point P as a common vertex; and $e_i$ may represent a length of any one edge formed by taking the mesh point P as a vertex, as shown in FIG. 8.

The maximum principal curvature $k_{max}$ of the mesh point P may be calculated according to the first characteristic quantity K(P) and the second characteristic quantity H(P) of the mesh point P by using Formula (3) as below:

$$k_{max} = H(P) + \sqrt{H^2(p) - K(p)} \quad (3).$$

The minimum principal curvature $k_{min}$ of the mesh point P may be calculated according to the first characteristic quantity K(P) and the second characteristic quantity H(P) of the mesh point P by using Formula (4) as below:

$$k_{min} = H(P) - \sqrt{H^2(p) - K(p)} \quad (4).$$

At block 135, the shape index characteristic value of each mesh point may be calculated according to the maximum principal curvature $k_{max}$ and the minimum principal curvature $k_{min}$ of each mesh point.

According to an example, the shape index characteristic value (SI) of each point on the mesh model may be calculated according to Formula (5) as below:

$$SI = \frac{1}{2} - \frac{1}{\pi}\arctan\frac{k_{min} + k_{max}}{k_{min} - k_{max}}. \quad (5)$$

The shape index characteristic value (SI) may have a value range of [0, 1], and different shape index characteristic values may correspond to different shapes. For example, to the mesh point P, when SI=0, this may indicate that shapes of isosurfaces nearby the mesh point are approximate to convex spherical surfaces; when SI=0.5, this may indicate that shapes of isosurfaces nearby the mesh point are approximate to saddles; when SI=0.75, this may indicate that shapes of isosurfaces nearby the mesh point are approximate to concave planes; and when SI=1, this may indicate that shapes of isosurfaces nearby the mesh point are approximate to concave spherical surfaces.

As can be known from schematic diagrams of ROI of polyps of the colon as shown in FIG. 3 and FIG. 5, a region constituted by mesh points whose SIs are approximate to 0 may be regarded as the region where polyps of the colon are.

After calculating the SI of each mesh point, a corresponding shape cost diagram may be obtained. For example, a region having different shape index characteristic values may be marked by using different colors to more clearly define target tissues.

Referring back to FIG. 1, at block 14, the mesh model may be split according to the distance field information, so as to obtain a set of initiation points and a set of termination points.

Figure 9:
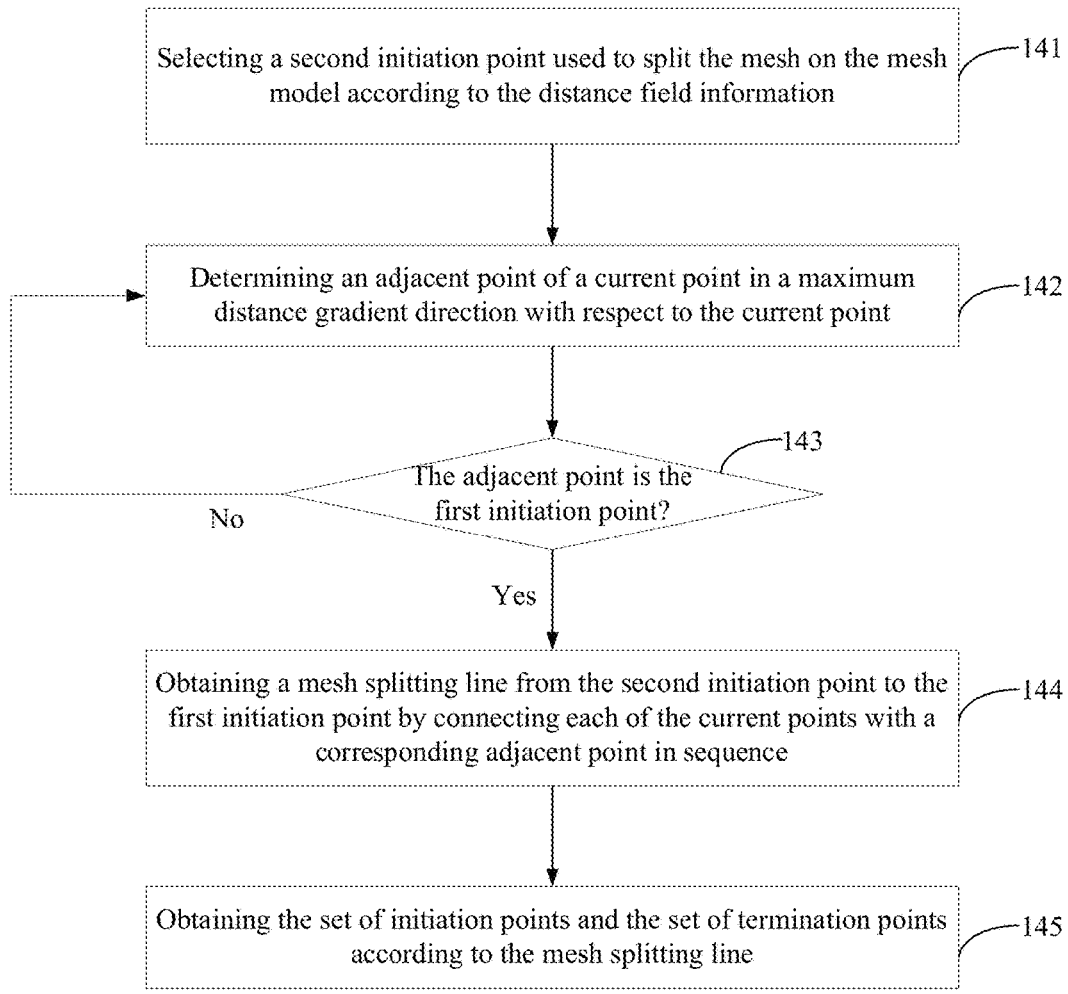
FIG. 9 illustrates a flowchart of a specific implementation of block 14 in FIG. 1 according to an example of the present disclosure.

FIG. 9 is a flowchart of a specific implementation of block 14 in FIG. 1 of the present disclosure, which may include the following blocks 141-145.

At block 141, a second initiation point used to split the mesh model may be selected on the mesh model according to the distance field information.

In the present disclosure, the second initiation point may be determined by using following two manners.

Manner I: the second initiation point may be obtained by selecting a mesh point whose MaxDis from the mesh point to the first initiation point is a maximum value according to the distance field information of the mesh model.

In other words, the maximum value of a MaxDis from the mesh point to the first initiation point may be acquired by comparing each MaxDis from each mesh point in the calculated distance field information to the first initiation point. In some cases, the maximum value of a MaxDis may correspond to a plurality of mesh points, from which one mesh point may be selected as the second initiation point for splitting the mesh model (or mesh splitting).

Manner II: the second initiation point may be obtained by selecting a mesh point whose MaxDis from the mesh point to the first initiation point is a specified length according to the distance field information of the mesh model.

Starting from the second initiation point, discovery of a plurality of adjacent points may be executed according to the following block 142 until the finally determined adjacent point is the first initiation point.

At block 142, an adjacent point of a current point may be determined in a maximum distance gradient direction with respect to the current point, where, the maximum distance gradient direction may indicate a direction along which a gradient of a distance between the current point and the adjacent point is maximum.

In an example of the present disclosure, the adjacent point of the current point may be a mesh point which is in the maximum distance gradient direction with respect to the current point within an adjacent region of the current point and the nearest to the current point.

At block 143, it may be determined whether the adjacent point is the first initiation point or not. If the adjacent point is the first initiation point, an iteration may be ended to proceed block 144. If the adjacent point is not the first initiation point, the adjacent point may be regarded as a next current point, and it may proceed back to block 142.

In a process of the foregoing iterative operation, the current point may be equivalent to a known variable. At the beginning of a first iterative operation, the second initiation point may be the current point, and an adjacent point of the second initiation point may be determined according to the foregoing block 142, e.g., a mesh point which is in a maximum distance gradient direction with respect to the second initiation point, within an adjacent region of the second initiation point and the nearest to the second initiation point. For example, the adjacent point of the second initiation point may be a mesh point N1, and the mesh point N1 may be regarded as a current point for a second iterative operation. In the second iterative operation, an adjacent point N2 of the mesh point N1 may be determined according to the block 142. Afterward, the mesh point N2 may be regarded as a current point for a third iterative operation, and so on.

At block 144, a mesh splitting line from the second initiation point to the first initiation point may be obtained by connecting each of the current points with a corresponding adjacent point in sequence.

At block 145, the set of initiation points and the set of termination points may be obtained according to the mesh splitting line.

A process of mesh splitting may be described hereinafter with reference to schematic diagrams of mesh splitting as shown in FIG. 10A and FIG. 10B.

First of all, a mesh point whose MaxDis from the mesh point to the first initiation point is a maximum value or a specified length may be selected as the second initiation point for mesh splitting according to the distance field information. As shown in FIG. 10A, the second initiation point may be a mesh point E, starting from the mesh point E, an adjacent point (such as a mesh point N) of the mesh point E may be determined according to a direction along which the distance gradient of the mesh point E is maximum. The two mesh points may construct a split edge $\overrightarrow{EN}$. The rest may be deduced by analogy until an adjacent point is determined to be the first initiation point B. In this way, the mesh splitting line $\overrightarrow{EB}$ may be obtained. According to split edges included in the mesh splitting line, an edge list EList of the mesh model may be traversed, and triangular patches where the split edges are positioned may be counted, which may constitute a patch set T, e.g., the region surrounded by black thick dash lines in FIG. 10A. As shown in FIG. 10A, points (including the mesh point B and the mesh point E) on the dashed line between the mesh point B and the mesh point E may constitute a point set PList.

As shown in FIG. 10B, the patch set T may be split into a patch subset T1 and a patch subset T2. Patches in the patch subset T1 may be mutually connected, so do patches in the patch subset T2. An intersection set of the patch subset T1 and the patch subset T2 may include the edge set EList and the point set PList. The point set PList may be copied to generate a new point set PList2. IDs of mesh points in the point sets PList and PList2 meet a one-to-one corresponding relationship, for example, a mesh point B2 in the point set PList2 may correspond to the mesh point B in the point set PList. The point set PList2 may be added into the mesh model. In this way, the point set in the patch subset T1 may be basically unchanged, but the point set in the patch subset T2 may be updated. For example, the ID of a mesh point included in the point set PList for the patch subset T2 may be replaced by the ID of a mesh point in the point set PList2. In addition, lists of relationship between each mesh point and each patch in the mesh model may also be updated, including PPList, FFList, PFList and FPList or the like so as to complete a process of mesh splitting. In this way, a split triangular mesh model may be obtained. The point set PList may be regarded as the set of initiation points associated with the mesh splitting line $\overrightarrow{EB}$, and the point set PList2 may be regarded as the set of termination points associated with the mesh splitting line $\overrightarrow{EB}$. As can be seen, both the first initiation point B and the second initiation point E may belong to the set of initiation points PList.

Referring back to FIG. 1, at block 15, a mixed cost value of each mesh point in the split mesh model may be obtained according to the distance field information, the shape index characteristic value, and a gray scale cost statistical value of each mesh point. FIG. 11 is a flowchart of a specific implementation of block 15 in FIG. 1 of the present disclosure, which may include the following blocks 151-152.

At block 151, the gray scale cost statistical value of each mesh point on the mesh model may be calculated.

The gray scale cost statistical value of a mesh point may include a first low density voxel number Num1 and a second low density voxel number Num2 corresponding to the mesh point. The first low density voxel number Num1 may indicate the number of target voxels included in a preset template. The preset template may take the mesh point as a center. For example, a CT value of the target voxel may be set lower than a second threshold. And the preset template may be a volume window having a size of 3 voxels×3 voxels×3 voxels. The value range of the second threshold may be −500 Hu~−700 Hu. The second low density voxel number Num2 may be the number of target voxels on a connecting line from the mesh point to the first initiation point.

At block 152, the mixed cost value fCost of each mesh point may be calculated by using Formula (6) as below:

$$fCost=(fw1\times Num1+fw2\times Num2+fw3\times|SI-0.5|)\times(MaxDis/Dis) \quad (6),$$

where fw1, fw2 and fw3 may be weighting coefficients; as mentioned above, the MaxDis may be the maximum distance from a mesh point to the first initiation point, and the Dis may be the minimum distance from the mesh point to the first initiation point.

A CT value may represent an X-ray attenuation coefficient of a substance or may also represent a density size relationship among various tissues. When calculating the mixed cost value of a mesh point, shape characteristics of isosurfaces nearby the mesh point may be denoted by a shape index characteristic value SI, and an effect for substance compositions of tissues on the mixed cost value may be denoted by the first low density voxel number Num1 and the second low density voxel number Num2. Thus, accuracy for cutting an image may be effectively improved by defining a target tissue according to the calculated mixed cost value.

Referring back to FIG. 1, at block 16, a cutting path may be determined according to the mixed cost value of each mesh point.

FIG. 12 is a flowchart of a specific implementation of block 16 in FIG. 1 of the present disclosure, which may include the following blocks 161-162.

At block 161, a minimum cost path from each initiation point to a corresponding termination point may be determined according to the mixed cost value of each mesh point. The minimum cost path can be considered as a candidate path from the initiation point to its corresponding termination point.

A triangular mesh model may be searched from one side of the mesh splitting line so as to acquire the minimum cost path of each group of point pair. The foregoing each group of point pair may include an initiation point and a corresponding termination point, where the initiation point may be a point in the set of initiation points PList, and the corresponding termination point may be a point in the set of termination points PList2. As shown in FIG. 10B, in a candidate path, the initiation point may be the mesh point E, and the corresponding termination point may be the mesh point E2. In another candidate path, the termination point corresponding to the initiation point B may be the mesh point B2. The cost value of a candidate path may indicate a sum of mixed cost values of all mesh points which the candidate path traverses. All mesh points may include the initiation point and the termination point. By comparing path cost values, the minimum cost path, that is, a candidate path, from an initiation point to a corresponding termination point may be determined.

At block 162, the cutting path may be obtained by comparing the path cost values of all the minimum cost paths (or all candidate paths), where the minimum cost path with the minimum cost value may be the cutting path.

In an example of the present disclosure, after block 161, the minimum cost path and the path cost value corresponding to each group of point pair may be obtained. A specific corresponding relationship may be shown in the following Table I.

TABLE I

| Point pair | Minimum cost path | Path cost value |
| --- | --- | --- |
| (E, E2) | (E, e1, e2, . . . E2) | L1 |
| (N, N2) | (N, n1, n2, . . . N2) | L2 |
| . . . | . . . | . . . |
| (B, B2) | (B, b1, b2, . . . B2) | Ln |

As can be known from Table I, in the mesh split model, the minimum cost path corresponding to each group of point pair may be denoted by a point set. For example, the minimum cost path corresponding to the point pair (E, E2) may be denoted by the point set (E, e1, e2, . . . E2). The path cost value L1 corresponding to the minimum cost path may be obtained by performing a summation calculation on the mixed cost value of each mesh point in the point set. Specifically, a calculation formula of the path cost value L1, Formula (7), may be expressed as below:

$$L1 = f_{cost}^{E} + f_{cost}^{e1} + f_{cost}^{e2} + \ldots + f_{cost}^{E2} \quad (7).$$

The rest may be deduced by analogy, in this way, the path cost value of the minimum cost path of each group of point pair may be obtained, respectively denoted by L1, L2, L3, . . . , Ln.

By comparing the path cost values of the minimum cost paths of the point pairs, the minimum path cost value may be determined, in this way, the minimum cost path corresponding to the minimum path cost value may be regarded as the cutting path.

In a schematic diagram of the minimum cost path as shown in FIG. 13, the mesh cutting line BE may be associated with the set of initiation points PList and the set of termination points PList2. By determining a minimum cost path from an initiation point to a corresponding termination point and then comparing a path cost value corresponding to each of the minimum cost paths, a minimum cost path g with the minimum path cost value may be determined as a cutting path of a target tissue, e.g., the polyps of the colon.

Referring back to FIG. 1, at block 17, a particular region corresponding to the target tissue may be cut, according to the cutting path, from the region of interest in the three-dimensional image.

Figure 15C:
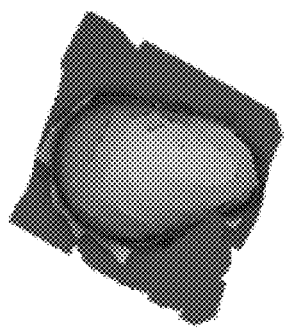
Figure 15D:
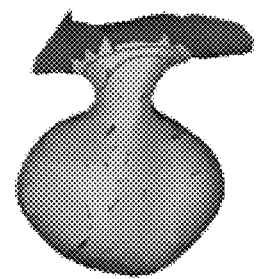
Figure 15E:
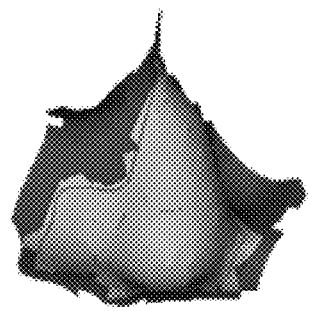

In an example of the present disclosure, the target tissue may be the polyps of the colon. FIG. 14 illustrates an effect diagram of cutting polyps of the colon from the region of interest as shown in FIG. 3 according to the method. In addition, the method of cutting a three-dimensional image provided by the present disclosure may also accurately cut other types of polyps of colon. For example, FIG. 15A, FIG. 15B and FIG. 15C illustrate effect diagrams of cutting sessile polyps of the colon. FIG. 15D illustrates an effect diagram of cutting pedicled polyps of the colon. FIG. 15E illustrates an effect diagram of cutting flat polyps of the colon. As can be seen, by using the method of cutting a three-dimensional image provided by the present disclosure, suspect lesion tissues may be quickly and accurately located and cut.

For exemplary purposes, the method provided by the present disclosure may be applicable to a colon system. However, it may be understood that the method may be applied to various other organs or anatomic sites known to a person skilled in the art, including but not limited to heart, brain, spine, colon, lung, liver and/or kidney systems.

Figure 16:
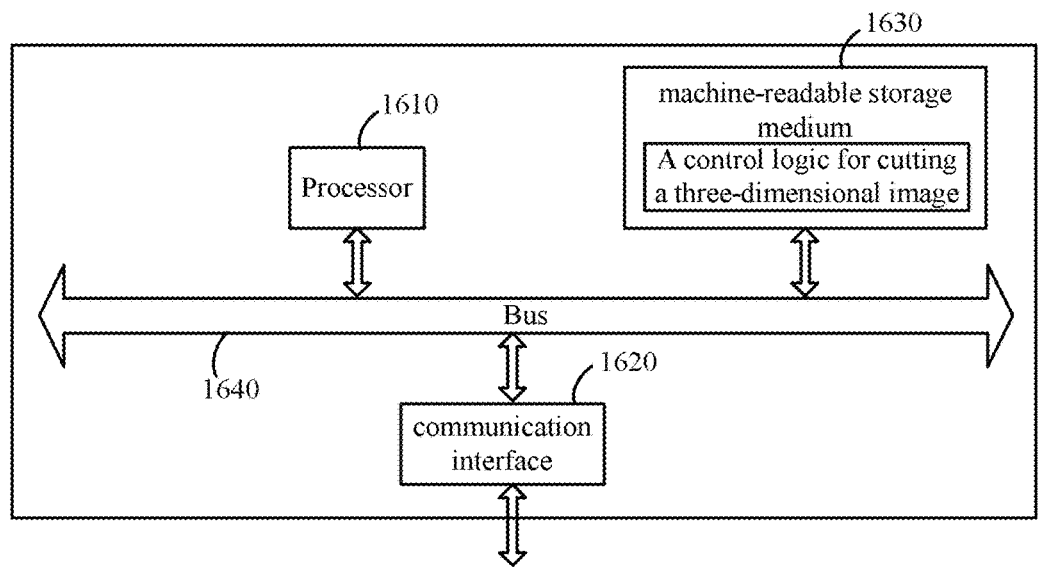
FIG. 16 illustrates a hardware structure diagram of a device of cutting a three-dimensional image according to an example of the present disclosure.

The method of cutting a three-dimensional image may be executed by medical image acquiring systems such as CT, PET, MRI and other control devices, where a structure of such a control device may be seen in a schematic diagram as shown in FIG. 16. The control device may include a processor 1610, a communication interface 1620, a machine-readable storage medium (memory) 1630 and a bus 1640. The processor 1610, the communication interface 1620 and the machine-readable storage medium 1630 may complete communications among each other through the bus 1640.

The machine-readable storage medium 1630 may store machine readable instructions corresponding to the control logic for cutting a three-dimensional image. The machine-readable storage medium may be, for example, a non-volatile memory. The processor 1610 may invoke the machine-executable instructions corresponding to the control logic for cutting a three-dimensional image in the machine-readable storage medium 1630 to execute the method of cutting a three-dimensional image. For example, the machine readable instructions corresponding to the control logic for cutting a three-dimensional image may be programs corresponding to some functions of software controlling an image collecting system. When the processor 1610 executes the instructions, the control device may correspondingly display a function interface corresponding to the instructions on a display interface.

When the function of the machine readable instructions corresponding to the control logic for cutting a three-dimensional image may be implemented in a form of a software functional unit and may be sold or used as an independent product, the instructions may be stored in a computer-readable storage medium. Based on such an understanding, a technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of blocks of the method as recited in the examples of the present disclosure. The aforementioned storage medium may include: a USB flash disk, a mobile hard disk, a read-only memory (ROM), a random access memory (RAM), a magnetic disk or an optical disk and other media capable of storing a program code.

Figure 17:
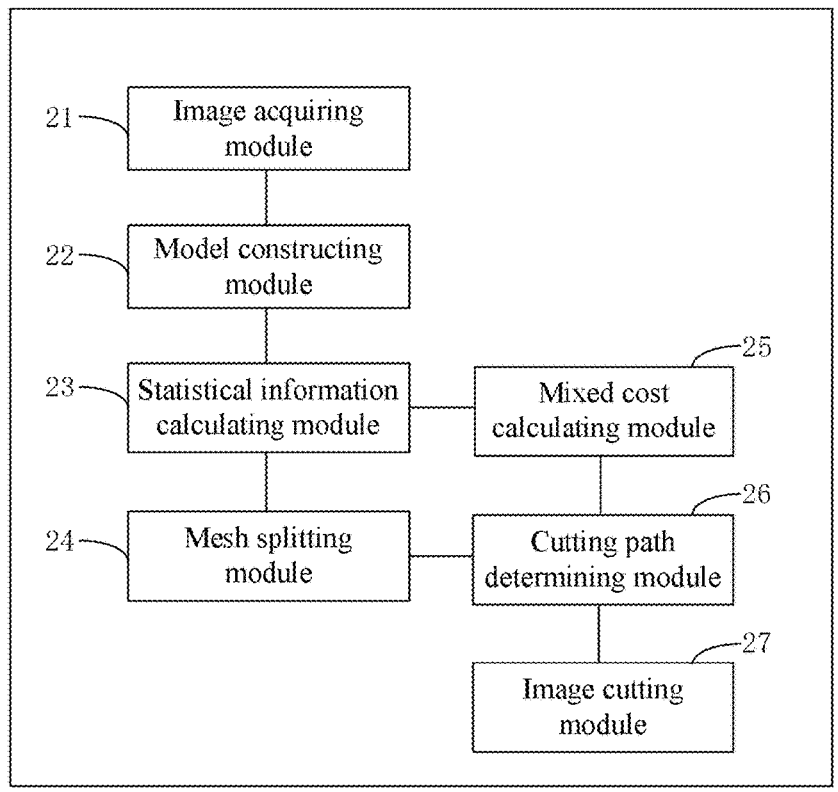
FIG. 17 illustrates a block diagram of a functional module of a control logic for cutting a three-dimensional image according to an example of the present disclosure.

Further, functionally divided, as shown in FIG. 17, the control logic for cutting a three-dimensional image may include the following modules 21-27:

an image acquiring module 21 may be configured to acquire an original three-dimensional image;

a model constructing module 22 may be configured to construct a mesh model of a region of interest by selecting the region of interest from the original three-dimensional image;

a statistical information calculating module 23 may be configured to obtain distance field information and a shape index characteristic value of each mesh point on the mesh model;

a mesh splitting module 24 may be configured to obtain a set of initiation points and a set of termination points by splitting the mesh model according to the distance field information of each mesh point;

a mixed cost calculating module 25 may be configured to calculate a mixed cost value of each mesh point according to the distance field information, the shape index characteristic value and an image value of each mesh point;

a cutting path determining module 26 may be configured to determine a cutting path from the set of initiation points and the set of termination points according to the mixed cost value of each mesh point; and an image cutting module 27 may be configured to cut a particular region corresponding to a target tissue from the region of interest in the three-dimensional image according to the cutting path.

Figure 18:
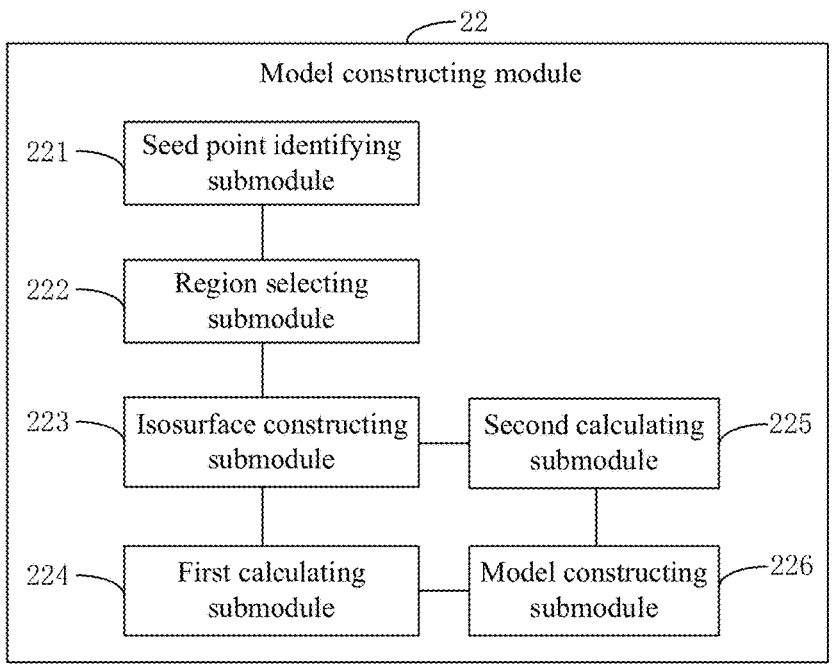
FIG. 18 illustrates a block diagram of a model constructing module in FIG. 17 according to an example of the present disclosure.

Further, referring to FIG. 18, which illustrates a structural block diagram of the model constructing module 22 according to an example of the present disclosure, the model constructing module 22 may include the following submodules 221-226:

a seed point identifying submodule 221 may be configured to identify, e.g., based on a user input, a seed point in the original three-dimensional image;

a region selecting submodule 222 may be configured to select the region of interest according to the seed point;

an isosurface constructing submodule 223 may be configured to construct an isosurface of the region of interest according to a preset first threshold, where the isosurface may be formed by splicing a plurality of isosurface patches, each of the isosurface patches may be formed by connecting three or more isometric points, and an image value of each of the isometric points may be equal to the first threshold;

a first calculating submodule 224 may be configured to determine a relationship between each isometric point and each isosurface patch in the isosurface, where the relationship may include a point-point relationship, a face-face relationship, a point-face relationship and a face-point relationship;

a second calculating submodule 225 may be configured to obtain a normal vector of each isometric point and a normal vector of each isosurface patch in the isosurface; and a model constructing submodule 226 may be configured to construct the mesh model of the region of interest according to the relationship between each isometric point and each isosurface patch in the isosurface, the normal vector of each isometric point and the normal vector of each isosurface patch.

In an example of another model constructing module of the present disclosure, the isosurface constructing submodule 223 may include a target region selecting submodule, which may be configured to select an isosurface having a maximum area for constructing the mesh model according to the seed point when the isosurface constructing submodule 223 constructs a plurality of isosurfaces according to the first threshold.

Figure 19:
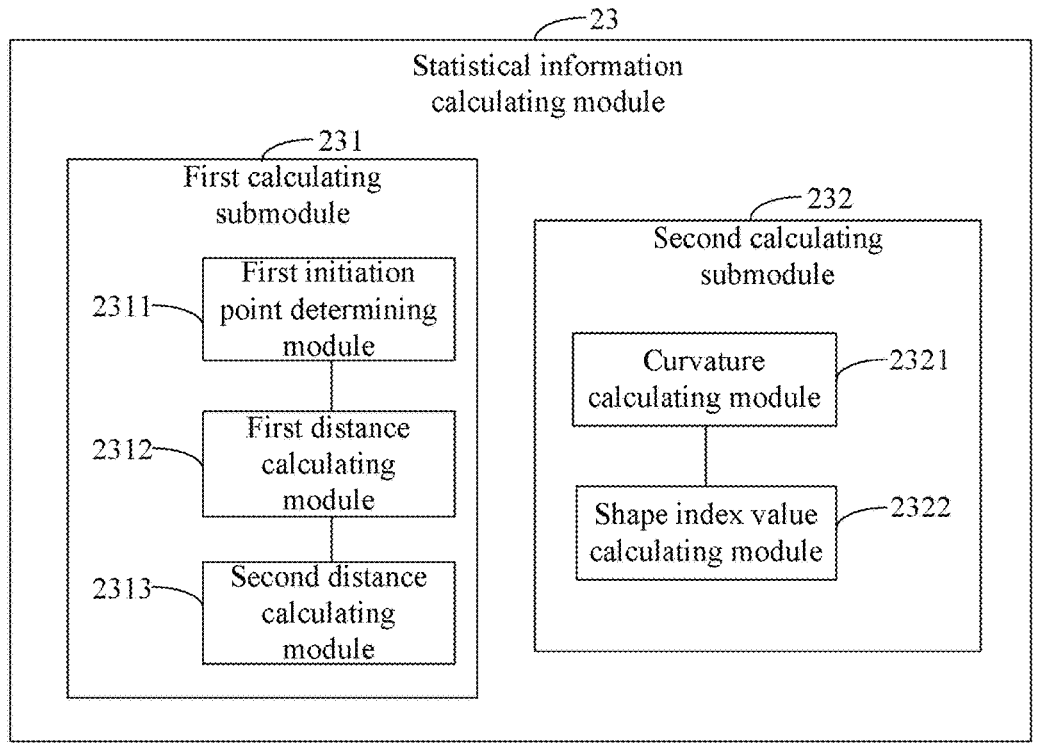
FIG. 19 illustrates a block diagram of a statistical information calculating module in FIG. 17 according to an example of the present disclosure.

Further, referring to FIG. 19, which illustrates a structural block diagram of the statistical information calculating module 23 according to an example of the present disclosure, the statistical information calculating module 23 may include a first calculating submodule 231 configured to calculate distance field information of each mesh point and a second calculating submodule 232 configured to calculate a shape index characteristic value of each mesh point. The first calculating submodule 231 may include:

a first initiation point determining module 2311 may be configured to obtain a first initiation point by selecting a mesh point from the mesh model according to the seed point, where the first initiation point may be used for determining a distance field;

a first distance calculating module 2312 may be configured to determine a minimum distance Dis from each mesh point on the mesh model to the first initiation point; and a second distance calculating module 2313 may be configured to determine a maximum distance MaxDis from each mesh point on the mesh model to the first initiation point.

The second calculating submodule 232 may include:

a curvature calculating module 2321 may be configured to calculate a maximum principal curvature $k_{max}$ and a minimum principal curvature $k_{min}$ of each mesh point in the mesh model; and a shape index value calculating module 2322 may be configured to calculate the shape index characteristic value SI of each mesh point with the maximum principal curvature $k_{max}$ and the minimum principal curvature $k_{min}$ according to a formula as below:

$$SI = \frac{1}{2} - \frac{1}{\pi}\arctan\frac{k_{min} + k_{max}}{k_{min} - k_{max}}.$$

Figure 20:
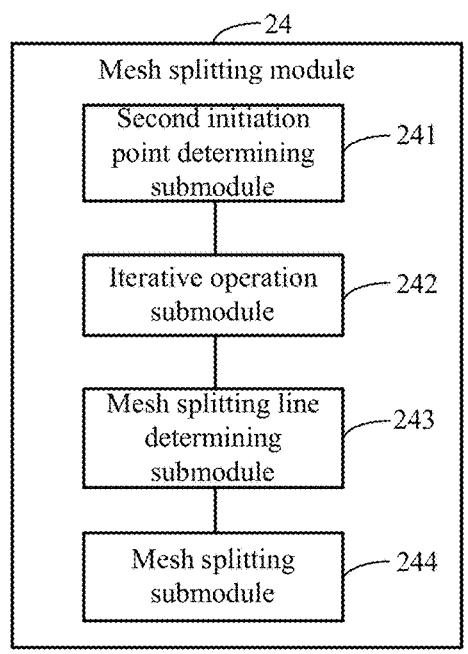
FIG. 20 illustrates a block diagram of a mesh splitting module in FIG. 17 according to an example of the present disclosure.

Further, referring to FIG. 20, which illustrates a structural block diagram of the mesh splitting module 24 according to an example of the present disclosure, the mesh splitting module 24 may include the following submodules 241-244:

a second initiation point determining submodule 241 may be configured to obtain a second initiation point by determining a mesh point in the mesh model according to the distance field information, where the second initiation point may be an initiation point for splitting the mesh;

an iterative operation submodule 242 may be configured to perform one or more iterative operations which are start from the second initiation point according to following blocks: determining an adjacent point of a current point in a direction along which a gradient of a distance between the adjacent and the current point is maximum, taking the adjacent point as a current point for a next iterative operation and ending the iterative operation until a determined adjacent point is the first initiation point;

a mesh splitting line determining submodule 243 may be configured to determine a mesh splitting line by connecting in sequence each of the current points with a corresponding adjacent point, where the mesh splitting line may extend from the second initiation point to the first initiation point by passing through one or more mesh points, each mesh point on the mesh splitting line may be in a maximum distance gradient direction with respect to a previous mesh point of the mesh point, the maximum distance gradient direction may indicate a direction along which a gradient of a distance between two mesh points is maximum; and a mesh splitting submodule 244 may be configured to obtain the set of initiation points and the set of termination points by splitting the mesh model according to the mesh splitting line.

Figure 21:
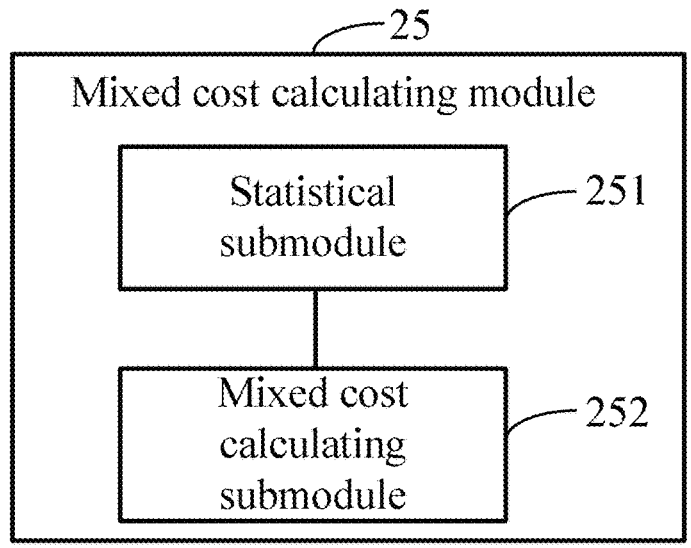
FIG. 21 illustrates a block diagram of a mixed cost calculating module in FIG. 17 according to an example of the present disclosure.

Further, referring to FIG. 21, which illustrates a structural block diagram of the mixed cost calculating module 25 according to an example of the present disclosure, the mixed cost calculating module 25 may include the following submodules 251-252:

a statistical submodule 251 may be configured to perform statistical calculation on a gray scale cost statistical value of a mesh point, where the gray scale cost statistical value of the mesh point may include a first low density voxel number Num1 and a second low density voxel number Num2, the first low density voxel number Num1 may be the number of voxels which are of image values lower than a second threshold and locating in a preset template with taking the mesh point as a center, and the second low density voxel number Num2 may be the number of voxels which are of image values lower than the second threshold and locating on a line extending from the mesh point to the first initiation point; and a mixed cost calculating submodule 252 may be configured to calculate the mixed cost value fCost of the mesh point by using a formula as below:

$$fCost=(fw1 \times Num1+fw2 \times Num2+fw3 \times |SI-0.5|) \times (MaxDis/Dis);$$

where, fw1, fw2 and fw3 may be weighting coefficients; MaxDis may be the maximum distance from the mesh point to the first initiation point; and Dis may be the minimum distance from the mesh point to the first initiation point.

Figure 22:
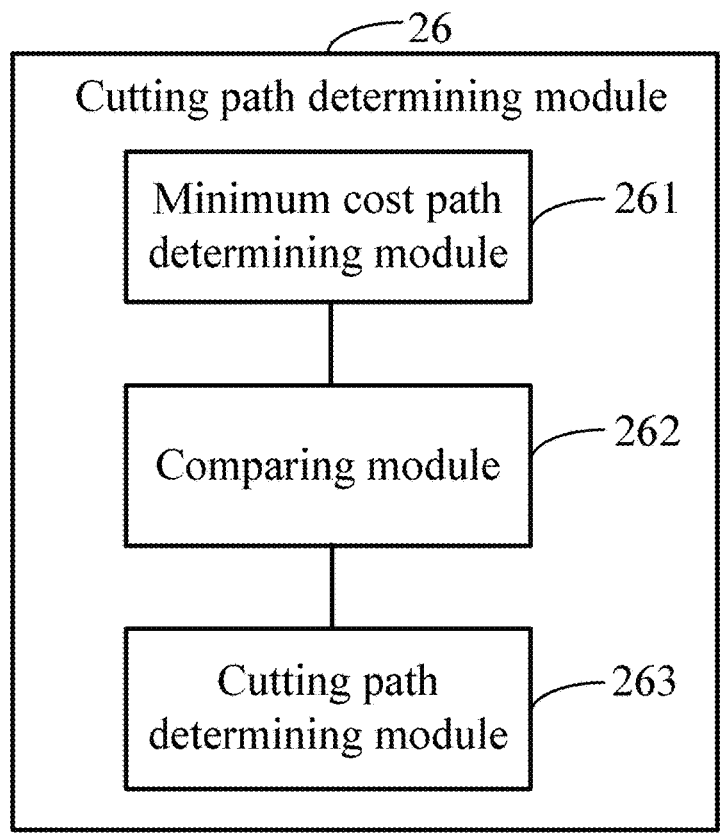
FIG. 22 illustrates a block diagram of a cutting path determining module in FIG. 17 according to an example of the present disclosure.

Further, referring to FIG. 22, which illustrates a structural block diagram of the cutting path determining module 26 according to an example of the present disclosure, the cutting path determining module 26 may include the following modules 261-263:

a minimum cost path determining module 261 may be configured to determine a candidate path which extends from an initiation point in the set of initiation points to a corresponding termination point in the set of termination points and has a minimum cost value among all paths from the initiation point to the corresponding termination point as a minimum cost path according to the mixed cost value of each mesh point;

a comparing module 262 may be configured to compare path cost values of all minimum cost paths (or all candidate paths) from the set of initiation points to the set of termination points, where a path cost value may indicate a sum of mixed cost values of all mesh points including an initiation point and a termination point on the path; and a cutting path determining module 263 may be configured to determine a minimum cost path having a minimum path cost value as the cutting path.

By taking software implementation as an example, the following further may describe how to execute the control logic by the device of cutting a three-dimensional image. In this example, the control logic of the present disclosure may be interpreted as machine readable instructions in the machine-readable storage medium 1630. When the processor 1610 on the device of cutting a three-dimensional image of the present disclosure may execute the control logic, by invoking the machine readable instructions stored on the machine-readable storage medium 1630, the processor 1610 may be caused to:

select a region of interest from an original three-dimensional image;

construct a mesh model of the region of interest, where the mesh model may be a triangular mesh model;

calculate distance field information and a shape index characteristic value of each mesh point on the mesh model;

obtain a set of initiation points and a set of termination points by splitting the mesh model according to the distance field information of each mesh point;

obtain a mixed cost value of each mesh point according to the distance field information, the shape index characteristic value and an image value of each mesh point; and determine a cutting path from the set of initiation points and the set of termination points according to the mixed cost value of each mesh point.

According to an example, the machine readable instructions may further cause the processor to cut a particular region corresponding to a target tissue from the region of interest in the three-dimensional image according to the cutting path.

According to an example, when selecting a region of interest from the original three-dimensional image, the machine readable instructions may cause the processor to identify, e.g., based on a user input, a seed point in the original three-dimensional image and select the region of interest according to the seed point.

According to an example, when constructing a mesh model of the region of interest, the machine readable instructions may further cause the processor to:

construct an isosurface of the region of interest according to a preset first threshold, where the isosurface may be formed by splicing a plurality of isosurface patches, each of the isosurface patches may be formed by connecting three or more isometric points, and an image value of each of the isometric points may be equal to the first threshold;

obtain a relationship between each isometric point and each isosurface patch in the isosurface, where the relationship may include a point-point relationship, a face-face relationship, a point-face relationship and a face-point relationship;

obtain a normal vector of each isometric point and a normal vector of each isosurface patch in the isosurface; and construct the mesh model of the region of interest according to the relationship between each isometric point and each isosurface patch in the isosurface, the normal vector of each isometric point and the normal vector of each isosurface patch.

Further, when a plurality of isosurfaces are constructed according to the first threshold, the machine readable instructions may further cause the processor to select an isosurface having a maximum area for constructing the mesh model.

According to an example, when obtaining the distance field information and the shape index characteristic value of each mesh point on the mesh model, the machine readable instructions may cause the processor to:

obtain a first initiation point by selecting a mesh point from the mesh model, where the first initiation point may be used for determining a distance field;

determine a minimum distance Dis from each mesh point on the mesh model to the first initiation point;

determine a maximum distance MaxDis from each mesh point on the mesh model to the first initiation point;

calculate a maximum principal curvature $k_{max}$ and a minimum principal curvature $k_{min}$ of each mesh point on the mesh model; and calculate the shape index characteristic value SI of each mesh point with the maximum principal curvature $k_{max}$ and the minimum principal curvature $k_{min}$ according to a formula as below:

$$SI = \frac{1}{2} - \frac{1}{\pi}\arctan\frac{k_{min}+k_{max}}{k_{min}-k_{max}}.$$

According to an example, when splitting the mesh model according to the distance field information of each mesh point, the machine readable instructions may cause the processor to:

obtain a second initiation point by determining a mesh point in the mesh model according to the distance field information, where the second initiation point may be an initiation point for splitting the mesh;

determine a mesh splitting line on the mesh model, where the mesh splitting line may extends from the second initiation point to the first initiation point by passing through one or more mesh points, each mesh point on the mesh splitting line may be in a maximum distance gradient direction with respect to a previous mesh point, the maximum distance gradient direction may indicate a direction along which a gradient of a distance between two mesh points is maximum; and obtain the set of initiation points and the set of termination points by splitting the mesh model according to the mesh splitting line.

According to an example, when calculating a mixed cost value of each mesh point according to the distance field information, the shape index characteristic value and the image value of each mesh point, the machine readable instructions may cause the processor to:

calculate a gray scale cost statistical value of a mesh point according to the image value of each mesh point, where the gray scale cost statistical value may include a first low density voxel number Num1 and a second low density voxel number Num2, the first low density voxel number Num1 may be the number of voxels which are of image values lower than a second threshold and locating in a preset template with taking the mesh point as a center, and the second low density voxel number Num2 may be the number of voxels which are of image values lower than the second threshold and locating on a line extending from the mesh point to the first initiation point; and calculate the mixed cost value fCost of the mesh point by using a formula as below:

$$fCost=(fw1 \times Num1+fw2 \times Num2+fw3 \times |SI-0.5|) \times (MaxDis/Dis);$$

where, fw1, fw2 and fw3 may be weighting coefficients;

MaxDis may be the maximum distance from the mesh point to the first initiation point; and Dis may be the minimum distance from the mesh point to the first initiation point.

According to an example, when determining a cutting path from the set of initiation points and the set of termination points according to the mixed cost value of each mesh point, the machine readable instructions may cause the processor to:

determine a candidate path which may extend from an initiation point to a corresponding termination point and have a minimum cost value among all paths from the initiation point to the corresponding termination point as a minimum cost path according to the mixed cost value of each mesh point; and obtain the cutting path by determining a path with a minimum cost value among all minimum cost paths (or all candidate paths) which may be determined with respect to the set of initiation points and the set of termination points as the cutting path, where a path cost value may be a sum of mixed cost values of all mesh points including an initiation point and a termination point on the path.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Accordingly, other embodiments are within the scope of the following claims.

The invention claimed is:

1. A method of cutting a three-dimensional image, comprising:
   selecting a region of interest from the three-dimensional image;
   constructing a mesh model of the selected region of interest;
   obtaining distance field information and a shape index characteristic value of each mesh point on the mesh model;
   obtaining a set of initiation points and a set of termination points by splitting the mesh model according to the distance field information of each mesh point;
   obtaining a mixed cost value of each mesh point according to the distance field information, the shape index characteristic value and an image value of each mesh point; and
   determining a cutting path from the set of initiation points and the set of termination points according to the mixed cost value of each mesh point by
      determining a candidate path which extends from an initiation point in the set of initiation points to a corresponding termination point in the set of termination points and has a minimum cost value among all paths from the initiation point to the corresponding termination point as a minimum cost path, wherein, the cost value of a path indicates a sum of mixed cost value of all mesh points including an initiation point and a termination point on the path, and
      determining a path with a minimum cost value among all minimum cost candidate paths determined with respect to the set of initiation points and the set of termination points as the cutting path.

2. The method according to claim 1, further comprising:
   cutting, according to the cutting path, a particular region corresponding to a target tissue from the region of interest in the three-dimensional image.

3. The method according to claim 1, wherein selecting a region of interest from the three-dimensional image comprises:
   identifying, based on a user input, a seed point in the original three-dimensional image; and
   selecting the region of interest according to the seed point.

4. The method according to claim 1, wherein constructing a mesh model of the region of interest comprises:
   constructing an isosurface of the region of interest according to a preset first threshold, wherein the isosurface is formed by splicing a plurality of isosurface patches, each of the isosurface patches is formed by connecting three or more isometric points, and an image value of each of the isometric points is equal to the first threshold;
   obtaining a relationship between each isometric point and each isosurface patch in the isosurface, wherein the relationship includes a point-point relationship, a face-face relationship, a point-face relationship and a face-point relationship;
   obtaining a normal vector of each isometric point and a normal vector of each isosurface patch in the isosurface; and
   constructing the mesh model of the region of interest according to the relationship between each isometric point and each isosurface patch in the isosurface, the normal vector of each isometric point and the normal vector of each isosurface patch.

5. The method according to claim 4, wherein when a plurality of isosurfaces are constructed according to the first threshold, the method further comprises:
   selecting an isosurface having a maximum area for constructing the mesh model.

6. The method according to claim 1, wherein obtaining distance field information and a shape index characteristic value of each mesh point on the mesh model comprises:
   obtaining a first initiation point by selecting a mesh point from the mesh model, wherein the first initiation point is used for determining a distance field;
   determining a minimum distance Dis from each mesh point on the mesh model to the first initiation point;
   determining a maximum distance MaxDis from each mesh point on the mesh model to the first initiation point;
   obtaining a maximum principal curvature $k_{max}$ and a minimum principal curvature $k_{min}$ of each mesh point on the mesh model; and
   obtaining the shape index characteristic value SI of each mesh point with the maximum principal curvature $k_{max}$ and the minimum principal curvature $k_{min}$ according to a formula as below:

$$SI = \frac{1}{2} - \frac{1}{\pi}\arctan\frac{k_{min} + k_{max}}{k_{min} - k_{max}}.$$

7. The method according to claim 1, wherein splitting the mesh model according to the distance field information of each mesh point comprises:
   obtaining a second initiation point by determining a mesh point in the mesh model according to the distance field information, wherein the second initiation point is an initiation point for splitting the mesh;
   determining a mesh splitting line on the mesh model, wherein, the mesh splitting line extends from the second initiation point to the first initiation point by passing through one or more mesh points, each mesh point on the mesh splitting line is in a maximum distance gradient direction with respect to a previous mesh point of the mesh point, and the maximum distance gradient direction indicates a direction along which a gradient of a distance between two mesh points is maximum; and
   obtaining the set of initiation points and the set of termination points by splitting the mesh model according to the mesh splitting line.

8. The method according to claim 1, wherein obtaining a mixed cost value of each mesh point according to the distance field information, the shape index characteristic value and an image value of each mesh point comprises:
   obtaining a gray scale cost statistical value of a mesh point according to the image value of the mesh point, wherein the gray scale cost statistical value comprises a first low density voxel number Num1 and a second low density voxel number Num2, the first low density voxel number Num1 indicates the number of voxels which are of image values lower than a second threshold and locating in a region defined by a preset template with taking the mesh point as a center, and the second low density voxel number Num2 indicates the number of voxels which are of image values lower than the second threshold and locating on a line extending from the mesh point to the first initiation point; and obtaining the mixed cost value fCost of the mesh point by using a formula as below:

$$fCost=(fw1\times Num1+fw2\times Num2+fw3\times|SI-0.5|)\times(MaxDis/Dis);$$

wherein, fw1, fw2 and fw3 are weighting coefficients;
MaxDis is the maximum distance from the mesh point to the first initiation point; and
Dis is the minimum distance from the mesh point to the first initiation point.

9. The method according to claim 1, wherein the mesh model comprises a triangular mesh model.

10. A device for cutting a three-dimensional image, comprising:
a processor which invokes machine readable instructions corresponding to a control logic for cutting a three-dimensional image stored in a storage medium and executes the machine readable instructions to:
select a region of interest from the three-dimensional image;
construct a mesh model of the selected region of interest;
obtain distance field information and a shape index characteristic value of each mesh point on the mesh model;
obtain a set of initiation points and a set of termination points by splitting the mesh model according to the distance field information of each mesh point;
obtain a mixed cost value of each mesh point according to the distance field information, the shape index characteristic value and an image value of each mesh point; and
determine a cutting path from the set of initiation points and the set of termination points according to the mixed cost value of each mesh point by
determining a candidate path which extends from an initiation point in the set of initiation points to a corresponding termination point in the set of termination points and has a minimum cost value among all paths from the initiation point to the corresponding termination point as a minimum cost path, wherein, the cost value of a path indicates a sum of mixed cost value of all mesh points including an initiation point and a termination point on the path, and
determining a path with a minimum cost value among all minimum cost candidate paths determined with respect to the set of initiation points and the set of termination points as the cutting path.

11. The device of claim 10, wherein the machine readable instructions further cause the processor to:
cut, according to the cutting path, a particular region corresponding to a target tissue from the region of interest in the three-dimensional image.

12. The device of claim 10, wherein, when selecting a region of interest from the three-dimensional image, the machine readable instructions further cause the processor to:
identify, based on a user input, a seed point in the original three-dimensional image; and
select the region of interest according to the seed point.

13. The device of claim 10, wherein when constructing a mesh model of the region of interest, the machine readable instructions further cause the processor to:
construct an isosurface of the region of interest according to a preset first threshold, wherein the isosurface is formed by splicing a plurality of isosurface patches, each of the isosurface patches is formed by connecting three or more isometric points, and an image value of each of the isometric points is equal to the first threshold;
obtain a relationship between each isometric point and each isosurface patch in the isosurface, wherein the relationship includes a point-point relationship, a face-face relationship, a point-face relationship and a face-point relationship;
obtain a normal vector of each isometric point and a normal vector of each isosurface patch in the isosurface; and
construct the mesh model of the region of interest according to the relationship between each isometric point and each isosurface patch in the isosurface, the normal vector of each isometric point and the normal vector of each isosurface patch.

14. The device of claim 13, wherein when a plurality of isosurfaces are constructed according to the first threshold, the machine readable instructions further cause the processor to:
select an isosurface having a maximum area for constructing the mesh model.

15. The device of claim 10, wherein when obtaining distance field information and a shape index characteristic value of each mesh point on the mesh model, the machine readable instructions further cause the processor to:
obtain a first initiation point by selecting a mesh point from the mesh model, wherein the first initiation point is used for determining a distance field;
determine a minimum distance Dis from each mesh point on the mesh model to the first initiation point;
determine a maximum distance MaxDis from each mesh point on the mesh model to the first initiation point;
obtain a maximum principal curvature $k_{max}$ and a minimum principal curvature $k_{min}$ of each mesh point on the mesh model; and
obtain the shape index characteristic value SI of each mesh point with the maximum principal curvature $k_{max}$, and the minimum principal curvature $k_{min}$ according to a formula as below:

$$SI=\frac{1}{2}-\frac{1}{\pi}\arctan\frac{k_{min}+k_{max}}{k_{min}-k_{max}}.$$

16. The device of claim 10, wherein when splitting the mesh model according to the distance field information of each mesh point, the machine readable instructions further cause the processor to:
obtain a second initiation point by determining a mesh point in the mesh model according to the distance field information, wherein the second initiation point is an initiation point for splitting the mesh;
determine a mesh splitting line on the mesh model, wherein, the mesh splitting line extends from the second initiation point to the first initiation point by passing through one or more mesh points, each mesh point on the mesh splitting line is in a maximum distance gradient direction with respect to a previous mesh point, the maximum distance gradient direction indicates a direction along which a gradient of a distance between two mesh points is maximum; and
obtain the set of initiation points and the set of termination points by splitting the mesh model according to the mesh splitting line.

17. The device of claim 10, wherein when obtaining a mixed cost value of each mesh point according to the distance field information, the shape index characteristic value and an image value of each mesh point, the machine readable instructions further cause the processor to:
  obtain a gray scale cost statistical value of a mesh point according to the image value of the mesh point, wherein the gray scale cost statistical value comprises a first low density voxel number Num1 and a second low density voxel number Num2, the first low density voxel number Num1 indicates the number of voxels which are of image values lower than a second threshold and locating in a region defined by a preset template with taking the mesh point as a center, and the second low density voxel number Num2 indicates the number of voxels which are of image values lower than the second threshold and locating on a line extending from the mesh point to the first initiation point; and
  obtain the mixed cost value fCost of the mesh point by using a formula as below:

$fCost=(fw1 \times Num1+fw2 \times Num2+fw3 \times |SI-0.5|) \times (MaxDis/Dis);$ wherein, fw1, fw2 and fw3 are weighting coefficients;
  MaxDis is the maximum distance from the mesh point to the first initiation point; and
  Dis is the minimum distance from the mesh point to the first initiation point.

18. The device of claim 10, wherein the mesh model comprises a triangular mesh model.

19. The method according to claim 1, wherein the image value represents one of an X-ray attenuation coefficient or absorption coefficient of a substance and a density size relationship among various tissues.

20. A method of cutting a three-dimensional image, comprising:
  selecting a region of interest from the three-dimensional image;
  constructing a mesh model of the selected region of interest;
  obtaining distance field information and a shape index characteristic value of each mesh point on the mesh model;
  obtaining a set of initiation points and a set of termination points by splitting the mesh model according to the distance field information of each mesh point;
  obtaining a mixed cost value of each mesh point according to the distance field information, the shape index characteristic value and an image value of each mesh point; and
  determining a cutting path from the set of initiation points and the set of termination points according to the mixed cost value of each mesh point,
  wherein splitting the mesh model according to the distance field information of each mesh point comprises:
    obtaining a second initiation point by determining a mesh point in the mesh model according to the distance field information, wherein the second initiation point is an initiation point for splitting the mesh;
    determining a mesh splitting line on the mesh model, wherein, the mesh splitting line extends from the second initiation point to the first initiation point by passing through one or more mesh points, each mesh point on the mesh splitting line is in a maximum distance gradient direction with respect to a previous mesh point of the mesh point, and the maximum distance gradient direction indicates a direction along which a gradient of a distance between two mesh points is maximum; and
    obtaining the set of initiation points and the set of termination points by splitting the mesh model according to the mesh splitting line.

* * * * *